3,559,204
AUDIO-VISIBLE ALERT SCALE SLING TRUCK
William Dashper, Weston, Ontario, Canada, assignor to Metropolitan Wire Goods Corporation, Wilkes-Barre, Pa., a corporation of New York
Filed May 9, 1968, Ser. No. 727,820
Int. Cl. G08b 21/00
U.S. Cl. 340—272          10 Claims

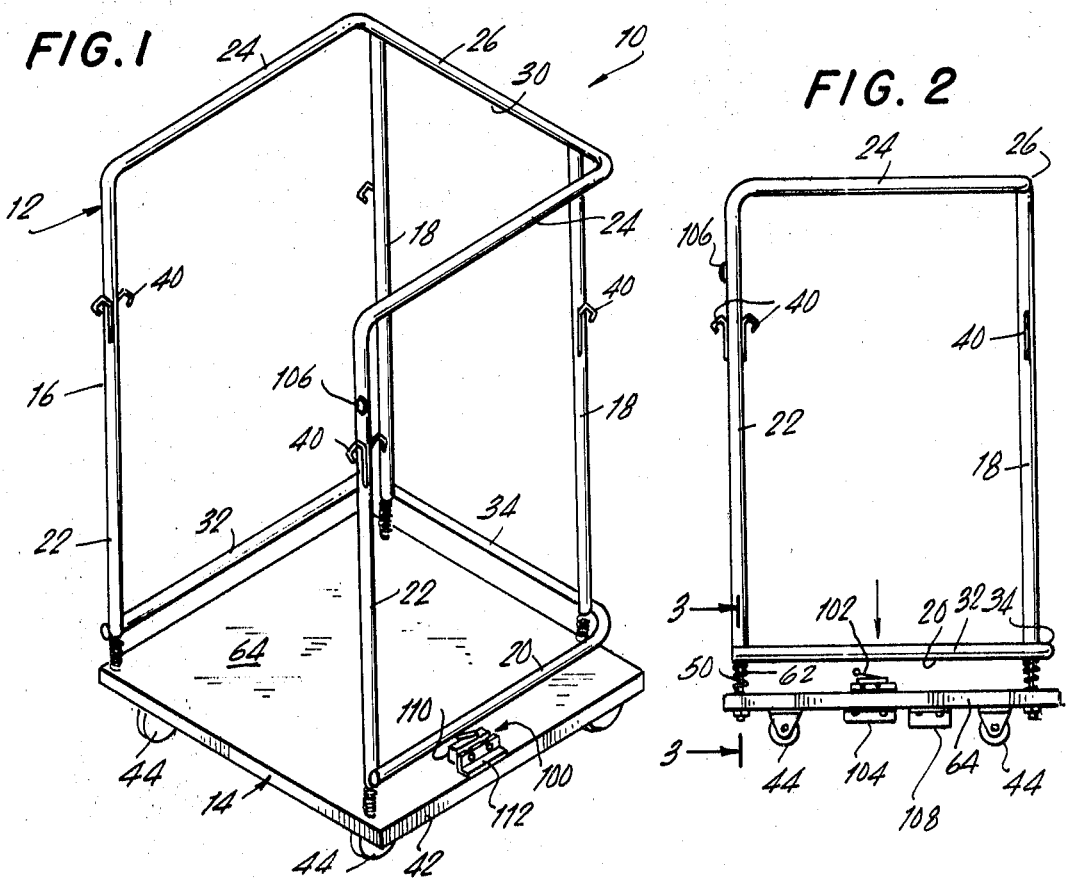
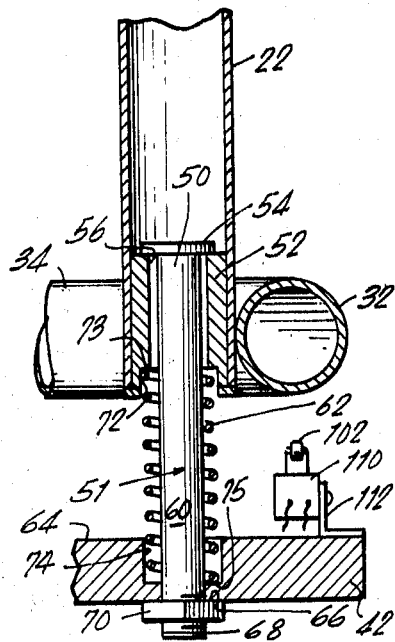
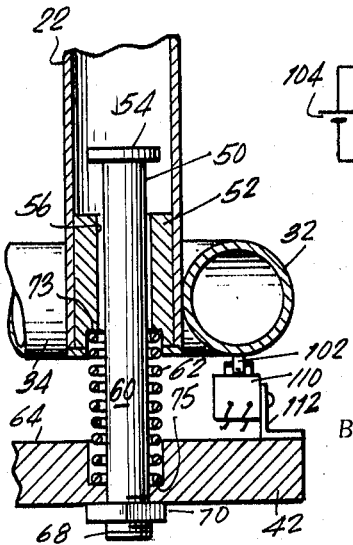
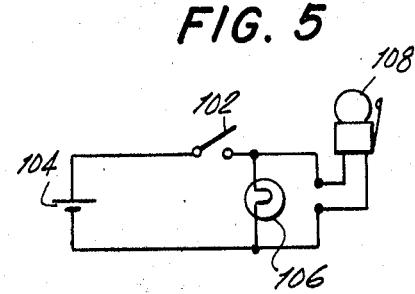
INVENTOR.
WILLIAM DASHPER though United States Patent Office 3,559,204
Patented Jan. 26, 1971

ABSTRACT OF THE DISCLOSURE

The invention is directed to a laundry sling truck which is adapted to give off an electric audio and/or visible alarm when linen deposited in a sling, hung in said truck, reaches a predesignated weight. The truck of the invention comprises a sling housing unit and a suitable dolly therefor, in combination with weighing and alarm means.

BACKGROUND OF THE INVENTION (1) Field of the invention

This invention relates generally to a laundry carrier and more particularly to a laundry sling truck suitable for use in central laundries.

(2) Description of the prior art

In institutional, central and commercial laundry establishments generally a laundry carrier is placed at the bottom of a linen chute and the filling thereof proceeds until the carrier is full. The carrier is then carted off to be weighed, weight recorded, and then taken to be washed. The problems relating to this method are: if the carrier is left unattended, the carrier will eventually spill linen over the surrounding area. Thus when the operator returns the spilled linen must be reloaded manually into another carrier. The carrier must then be taken to a weighing device to determine correctness of weight. If over or under specified load, linen must be removed or added.

Under some circumstances, a carrier is placed in a sorting room and linen is placed in a sling mounted to the carrier. When the carrier is full, it is taken to a weighing device to be weighed, weight recorded and then taken to be washed. Problems relating to this method are: if over or under a specified limit, linen must be removed or added. These methods result in wasted time and motion and inaccurate weighing which will tend to either overload washing equipment or not load washing equipment to its specified capacity. All of these factors are economically unsuitable for the described types of operations.

SUMMARY OF THE INVENTION

It is therefore among one of the principal objectives of the invention to provide an improved laundry carrier which is adapted to audibly and/or visibly alert the operator when the maximum linen capacity thereof has been reached.

In accordance with the present invention, a laundry sling truck or carrier is provided which is adapted to give off an electric audio and/or visible alarm when linen deposited in a sling, hung in said truck reaches a given weight, e.g., 100, 200, 300 lbs., or whatever weight desired, thereby signaling to the operator that the required weight has been reached.

The improved laundry sling truck comprises a housing unit adapted to hold a sling, and a dolly therefor, in combination with weighing and alarm means, said weighing and alarm means acting in association to automatically signal at a predetermined weight.

BRIEF DESCRIPTION OF THE DRAWING

The invention will be hereinafter more fully described with reference to the accompanying drawing in which:
FIG. 1 is a view in perspective of the invention truck (without sling).
FIG. 2 is a side elevational view of the truck.
FIG. 3 is a fragmentary, sectional view taken along line 3—3 of FIG. 2 and showing the alarm in the unactuated condition.
FIG. 4 is a view similar to FIG. 3 except that the alarm is now shown in the actuated condition.
FIG. 5 is a view showing the alarm circuit in one particular embodiment of the invention.

DESCRIPTION OF THE PREFERRED EMBODIMENTS

Referring now to the figures of the drawing, and particularly to FIGS. 1 and 2, there is shown a laundry sling truck 10, according to the invention, and comprising a sling housing unit 12 and dolly 14 joined thereto, which joinder will be subsequently more fully described. The housing unit 12 is made of tube metal and further comprises a main structure form 16, a pair of rear form rods 18, and a support form 20. Main structure form 16 has a pair of opposing parallel, vertical legs 22, integrally joined to a pair of opposing parallel, horizontal arms 24 bent at 90° angles thereto, said arms being each connected at one end thereof by a cross-arm 26, integrally joined and bent at 90° angles thereto. Rear form rods 18 are welded or bolted (preferably the former) to cross-arm 26 at right angles thereto in parallel opposing relation to each other, each rod 18 being disposed just inside of the 90° angle bent and smoothly abutting against the underside 30 of cross-arm 26. A support form 20 is provided which is essentially U-shaped comprising a pair of parallel, opposing support rods 32 each connected at one end thereof by a cross-rod 34 integrally joined and bent at 90° angles thereto. The support form 20 is welded to the extreme lower ends of rear form rods 18 and vertical legs 22 at the outside surfaces thereof and in smooth end relation therewith; so that support rods 32 are in parallel, opposing relation to horizontal arms 24 and cross-rod 34 is in parallel, opposing relation to cross-arm 26.

A sling strap hook 40 is provided on each of vertical legs 22 and rear form rods 18 about ¼ of the way down from the top of the sling housing unit 12 (represented by horizontal arms 24 and cross-arm 26) for purposes of holding the filling end of the sling (not shown) open. The hooks 40 on rear form rods 18, preferably face outwardly of the inside of the housing unit 12, whereas hooks 40 on vertical legs 22 face inwardly towards the inside of said housing unit. Another hook 40 can be provided, if desired, on each of vertical legs 22, facing directly oppositely to the other previously mentioned hooks.

The dolly 14 is of conventional construction, being preferably made of extruded aluminum, and comprising a rectangular or square shaped platform 42 (depending on the shape of the housing unit). This platform shape not being critical but merely for the sake of convenience, provided with 4 casters 44, one at each approximate corner. The wheel diameter and the weight bearing capability of the casters 44 will be related to the weight to be carried by the sling truck 10.

The sling housing unit 12 and dolly 14 are fitted together, according to the invention, using four machined pins 50, one for each of vertical legs 22 and rear form rods 18, as follows (FIGS. 3, 4); guide plugs 52 of generally cylindrical, annular construction are welded in concentric fashion, in the open end of each vertical leg 22 and rear form rod 18. The pins 50, each comprising a cylindrical shank portion 51 surmounted by a flat, round head 54, are each placed by means of shank 51 through a reamed bore 56 provided in guide plug 52, leaving a free end 60 to shank 51. Shank 51 is thus slidingly movable in guide plug 52 in vertical fashion, being of a slightly smaller diameter than bore 56. Round head 54 is of a larger diameter than bore 56, so that pin 50 is retained in guide plug 52. A metal spring 62 (whose function and description will be subsequently more fully set forth) is then placed over each free end 60 of the machined pins 50. The pins 50 are each then bolted in a 90° position, in relation to the horizontal face 64 of platform 42, through bores 66 provided for that purpose at the corners of platform 42, the pins 50 each having a threaded end portion 68 for threading a bolt 70 thereon. It is of course understood that pins 50 are placed in the guide plugs before they are welded to the respective open ends.

The respective ends of each spring 62 are accommodated inside the bore 72 of guide plug 52 and bore 74 of platform 42; bore 72 being of wider diameter than bore 56 to form a stopping shoulder 73 for the spring 62 at that end, and bore 74 being of wider diameter than bore 66 to form another stopping shoulder 75 for the other end of the spring.

Thus, it will be apparent that each leg 22 and rear form rod 18 is free to ride up or down along its vertical axis depending on the tension of spring 62 and the force brought to bear on it. The force is provided by the linen contained in the sling (not shown) which is maintained in the open and supported condition by hooks 40. A spring is chosen whose tension will be such as to support a sling having a linen capacity of 100, 200, 300 lbs., or whatever weight is desired. When the desired weight is attained, the sling will depress the housing unit 12 on its spring mounted legs 22 and rear form rods 18 to activate the alarm system described hereinbelow. Thus, in effect a weighing scale is provided by the springs 62 having whatever maximum weight is desired. As illustrated in FIG. 3, the spring 62 is in the uncompressed condition, as it would be when the linen sling is empty or below its maximum capacity. On the other hand, as illustrated by FIG. 4, the spring 62 is in the compressed condition caused by virtue of the maximum weight supported by its tension being reached or exceeded.

The alarm system can be adapted to give an audible or visible alert, or both, as desired. The alarm assembly 100 is mounted to the face 64 of platform 42 directly under a support rod 32 (it could also be under cross-rod 34). As shown by FIG. 5, a microswitch 102 is shown connected to a power source 104 consisting of a low current maximum life DC battery. Completing the circuit and activated by the closure of the switch 102, are a parallel-connected lamp 106 and a bell 108. It is also to be understood that the lamp and bell could be connected in series but this is less preferred. It is also to be understood that the alarm alert can consist of only the bell, or only the lamp, as desired. The battery and bell, as shown in this embodiment, are mounted on the platform's underface, while the lamp 106 is mounted in the upper portion of one of the vertical legs 22, the connecting wires being strung through the hollow in the tube metal forming the housing unit. The switch 102 is preferably housed in a vapor locked base 110 which is vertically adjustable by virtue of its slidable mounting with mounting angle bracket 112. Switch 102 is positioned so that it is directly under support rod 32, so that it can be closed thereby.

Describing now the operation of the invention, which is particularly well suited to an overhead monorail system, a sling (not shown, since it is of conventional design) is mounted in housing unit 12 by means of the hooks 40, and the unit is placed at a linen filling point, e.g., a chute. The spring 62 will be in the condition shown by FIG. 3. When the linen deposited in the sling reaches a predetermined weight, e.g., 100 lbs. for purposes of illustration, the spring having been chosen whose tension would support just below that weight, the sling housing unit 12 is displaced downwardly, in the direction of the arrow shown in FIG. 3, along its vertical axis (as described hereinabove) by virtue of its spring mounting. When the correct predetermined weight has been reached, the housing unit 12 will be at a predetermined vertical level (FIG. 4), at which time it closes switch 102 by means of its support rod 32 resting on switch 102, thereby resultingly activating the alarm system; in this case a bell and lamp. The operator is thus alerted, wherever he may be, and the truck is then wheeled to the loading station of the overhead monorail system where the sling is removed. The truck is then returned to its filling point and refitted with an empty sling. The spring is now back in the condition of FIG. 3.

The size of the housing unit will vary depending on the outside dimensions of the sling to be used therewith. An illustrative set of dimensions serving as a specific example of the invention, but not intended to be limitative thereof are as follows:

Sling 24" l. x 20" w. x 40" h.
Housing Unit 28" l. x 24" w. x 50" h.

As mentioned hereinabove, the weight bearing capability of the unit will vary as desired, and a spring will be chosen whose tension fits the particular weight required. Preferably, the spring will be of such tension that it will be compressed slowly, as the weight on it increases, so that the unit will not come crashing down on the switch when the maximum weight is reached.

Having thus described the invention in a specific embodiment thereof, it is to be understood that various changes may be made by those skilled in the art without departing from the spirit and scope thereof.

What is claimed is:

1. A laundry sling truck which comprises a housing unit adapted to hold a linen sling and transporting means therefor in combination with weighing and alarm means, said weighing and alarm means acting in association to automatically signal at a predetermined weight of said linen sling, wherein said housing unit comprises tube metal and further comprises a main structure form, a pair of rear form rods and a support form therefor, said main structure form having a pair of opposing, parallel vertical legs integrally joined to a pair of opposing, parallel horizontal arms bent at substantially 90° angles thereto, said arms being each connected at one end thereof by a cross-arm integrally joined and bent at 90° angles thereto, said rear form rods being connected to said cross-arm at right angles thereto and in parallel opposing relation to one another, said support form having a pair of parallel, opposing support rods each connected at one end thereof by a cross-rod integrally joined and bent at 90° angles thereto, said support form being secured to the respective lower ends of said vertical legs and rear form rods so that said support rods are in parallel, opposing relation to said horizontal arms and said cross-rod is in parallel, opposing relation to said cross-arm.

2. A truck according to claim 1 wherein said transporting means comprise a dolly.

3. A truck according to claim 2 wherein said weighing means further comprise a guide plug of generally cylindrical, annular construction secured in concentric relation in the open end of each of said vertical legs and rear form rods, a machined pin comprising a shank portion and head therefor, said shank being slidingly disposed inside the bore formed by said guide plug leaving a free end thereof, a spring being provided on said free end of said machined pin shank, said spring having a predetermined weight capacity by virtue of its tension.

4. A truck according to claim 3 wherein said dolly further comprises a generally flat, four sided platform member, said pins being each mounted at a corner of said platform member through a bore provided for that purpose, the respective ends of said spring being disposed inside shouldered portions of the bores of said guide plug and platform member, with the result that said housing unit is springingly and weightingly mounted on said dolly.

5. A truck according to claim 4 wherein said housing unit actuates said alarm means when said predetermined weight capacity is attained, said alarm means further comprising at least an electric audio alarm whose switch means are closed when a portion of said housing unit presses thereon upon reaching said predetermined weight.

6. A truck according to claim 5 wherein a visible alarm is also provided.

7. A truck according to claim 6 wherein said alarm means consist of a bell and lamp connected to said switch means and activated thereby.

8. A laundry sling truck which comprises a housing unit adapted to hold a linen sling and including a top portion, an intermediate portion and a bottom portion, transporting means for said housing unit being connected therewith, weighing and alarm means acting in cooperative association with said housing and said transportation means to automatically signal at a predetermined weight of said linen sling.

9. A truck according to claim 8 wherein mounting means are provided on said housing unit for supporting a linen sling.

10. A truck according to claim 9 wherein said automatic signal is given when linen deposited in a sling mounted in said housing unit reaches said predetermined weight.

References Cited
UNITED STATES PATENTS

| | | | |
|---|---|---|---|
| 299,649 | 6/1884 | Keep | 340—272 |
| 3,127,948 | 4/1964 | Nitenson | 177—45 |

THOMAS B. HABECKER, Primary Examiner

J. M. BOBBITT, Assistant Examiner

U.S. Cl. X.R.

200—85; 177—45, 245, 253